US007606122B2

(12) United States Patent
Lee et al.

(10) Patent No.: US 7,606,122 B2
(45) Date of Patent: Oct. 20, 2009

(54) LAYER-JUMPING AND FOCUSING CONTROL METHOD

(75) Inventors: Yi-Chung Lee, Hsinchu (TW); Hsiang-Yi Fu, Hsinchu (TW); Tun-Chieh Lee, Hsinchu (TW); Fu-Hsiang Chen, Hsinchu (TW)

(73) Assignee: Lite-On It Corp., Taipei (TW)

( * ) Notice: Subject to any disclaimer, the term of this patent is extended or adjusted under 35 U.S.C. 154(b) by 651 days.

(21) Appl. No.: 11/320,260

(22) Filed: Dec. 27, 2005

(65) Prior Publication Data

US 2006/0153024 A1    Jul. 13, 2006

(30) Foreign Application Priority Data

Jan. 10, 2005    (TW) .............................. 94100664 A (51) Int. Cl.
*G11B 7/00*    (2006.01)
(52) U.S. Cl. ................. 369/44.29; 369/44.41
(58) Field of Classification Search ....................... None
See application file for complete search history.

(56) References Cited

U.S. PATENT DOCUMENTS

2003/0012092 A1*   1/2003   Katayama ................ 369/44.23
2003/0103424 A1*   6/2003   Sun ......................... 369/44.27

* cited by examiner

Primary Examiner—Hoa T Nguyen
Assistant Examiner—Emily Frank
(74) Attorney, Agent, or Firm—WPAT, PC; Justin I. King (57) ABSTRACT

In a layer jump and focusing control method, a first focusing error signal is generated according to the differential astigmatism method in a closed-loop focusing control manner when focusing on the first recording layer. A second focusing error signal is generated according to the astigmatic method in an open-loop focusing control manner when a first layer-jumping procedure is performed to shift a focusing position from the first recording layer to the second recording layer. Then, the completion of the first layer-jumping procedure is determined according to the second focusing error signal, for example when the second focusing error signal passes the zero crossing point and exceeds a threshold level. Afterwards, a third focusing error signal is generated according to the differential astigmatism method in a closed-loop focusing control manner when focusing on the second recording layer.

10 Claims, 7 Drawing Sheets

LAYER-JUMPING AND FOCUSING CONTROL METHOD

FIELD OF THE INVENTION

The present invention relates to a layer-jumping and focusing control method, and more particularly to a layer-jumping and focusing control method for use in a disc reading apparatus such as an optical disc drive.

BACKGROUND OF THE INVENTION

For reading data from an optical disc, the optical pickup head is moved in two directions, i.e. a direction perpendicular to the disc face, which is referred to as a focusing direction, and a direction parallel to the disc face, which is referred to as a tracking direction. Meanwhile, the light emitted by a light source such as a laser diode is focused by an object lens of the optical pickup head on the optical disc, and the light reflected by the optical disc is transmitted to a light sensor to extract data. According to the obtained data, focusing errors and tracking errors are generated and referred to for further adjusting the movement of the pickup head in the focusing direction and the tracking direction.

Figure 1A:
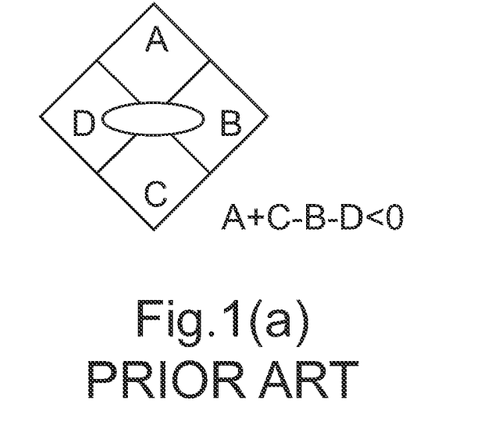
FIGS. 1(a), 1(b) and (c) are diagrams schematically illustrating three possible situations of a focusing error signal FE generated according to an astigmatic method.
Figure 1B:
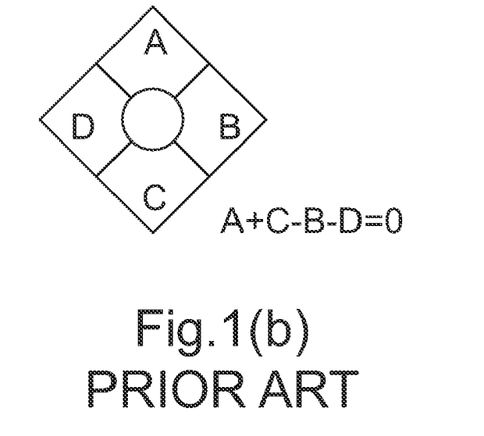
Figure 1C:
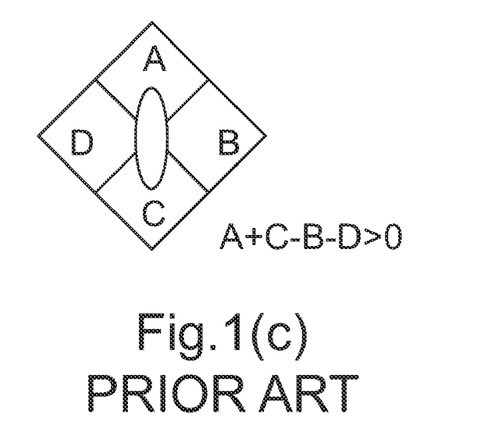
Figure 1D:
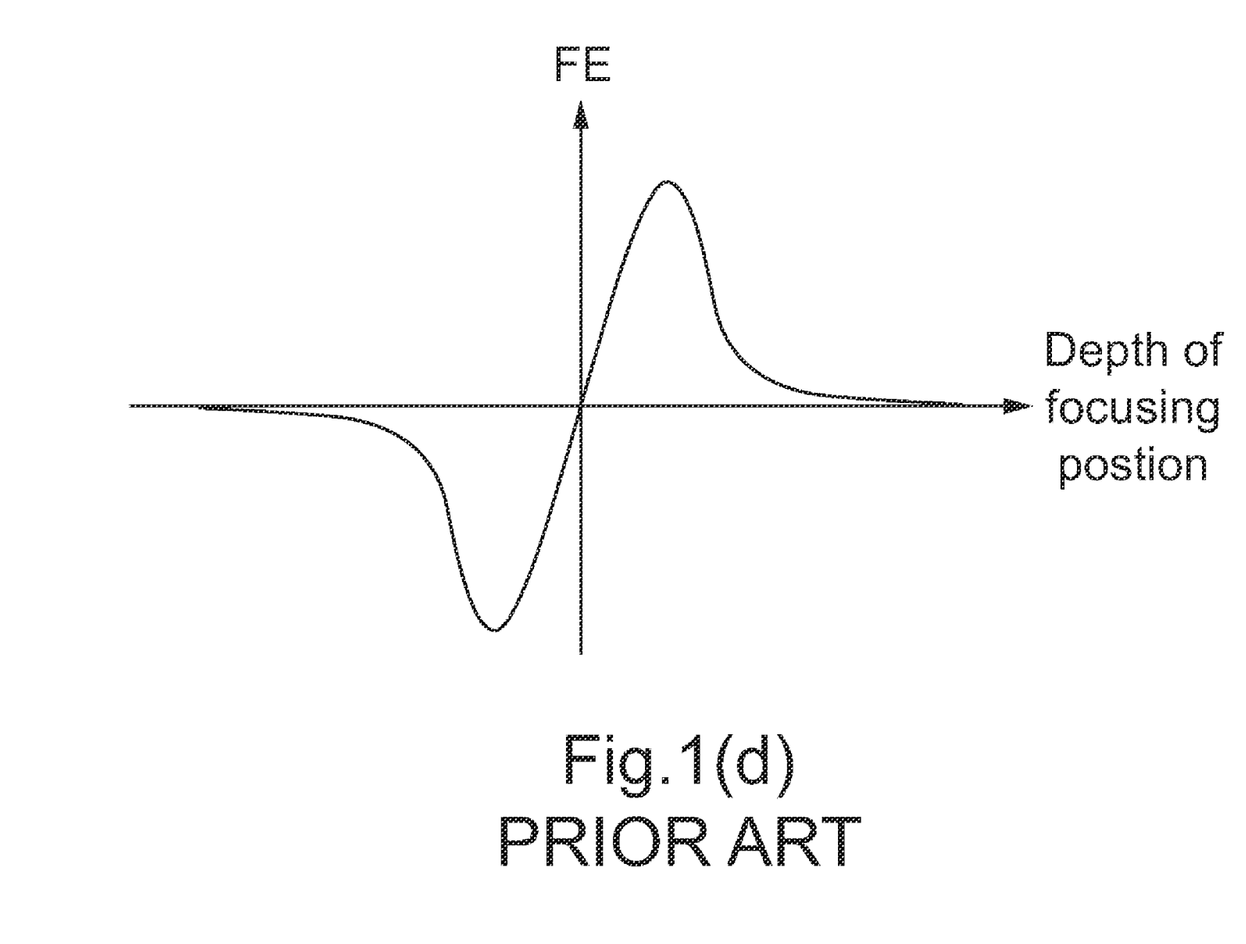
FIG. 1(d) is a waveform diagram schematically illustrating focusing error variations with focusing positions when focusing on a single-layer disc according to the astigmatic method.

To correct the focusing error, an astigmatic method can be employed for focusing control. For implementing the astigmatic method, the optical sensor of an optical disc drive is required to include four light receiving parts A, B, C and D for respectively receiving the main beam reflected from the disc, as can be seen in any of FIGS. 1(a)~1(c). As far as a focusing operation is concerned, the focusing error signal FE is substantially a difference between the summation of the overall light intensity received by the receiving parts A and C and the summation of the overall light intensity received by the receiving parts B and D, i.e. (A+C)−(B+D), where A, B, C and D are light intensities received by the regions A, B, C and D, respectively. FIGS. 1(a)~1(c) illustrate three kinds of focusing results. When the light emitted by the light source is perfectly focused on the desired point, as shown in FIG. 1(b), the overall light intensity received by the receiving parts B and D will be equal to that the overall light intensity received by the receiving parts A and C, i.e. FE=(A+C)−(B+D)=0. In another case shown in FIG. 1(a), the value of (A+C)−(B+D) is minus, which indicates a focusing position above the perfect position. On the other hand, in the case shown in FIG. 1(c), the positive value of (A+C)−(B+D) indicates a focusing position below the perfect position. The relationship between the voltage of the focusing error signal FE and the depth of the focusing position (or the distance of the focusing position from the lens) is illustrated in FIG. 1(d). The astigmatic method is performed in a closed-loop focusing control manner to zero the focusing error FE, thereby locating the perfect focusing position.

Figure 2A:
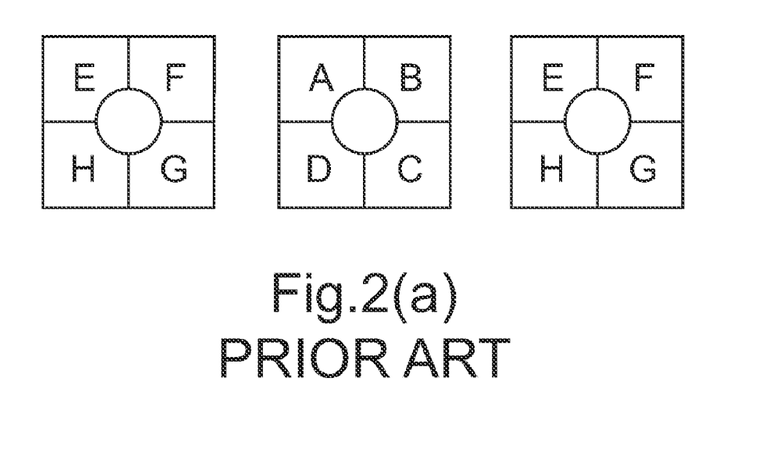
FIG. 2(a) is a diagram schematically illustrating three regions of an optical sensor for receiving a main beam and two sub-beams according to a differential astigmatism method.
Figure 2B:
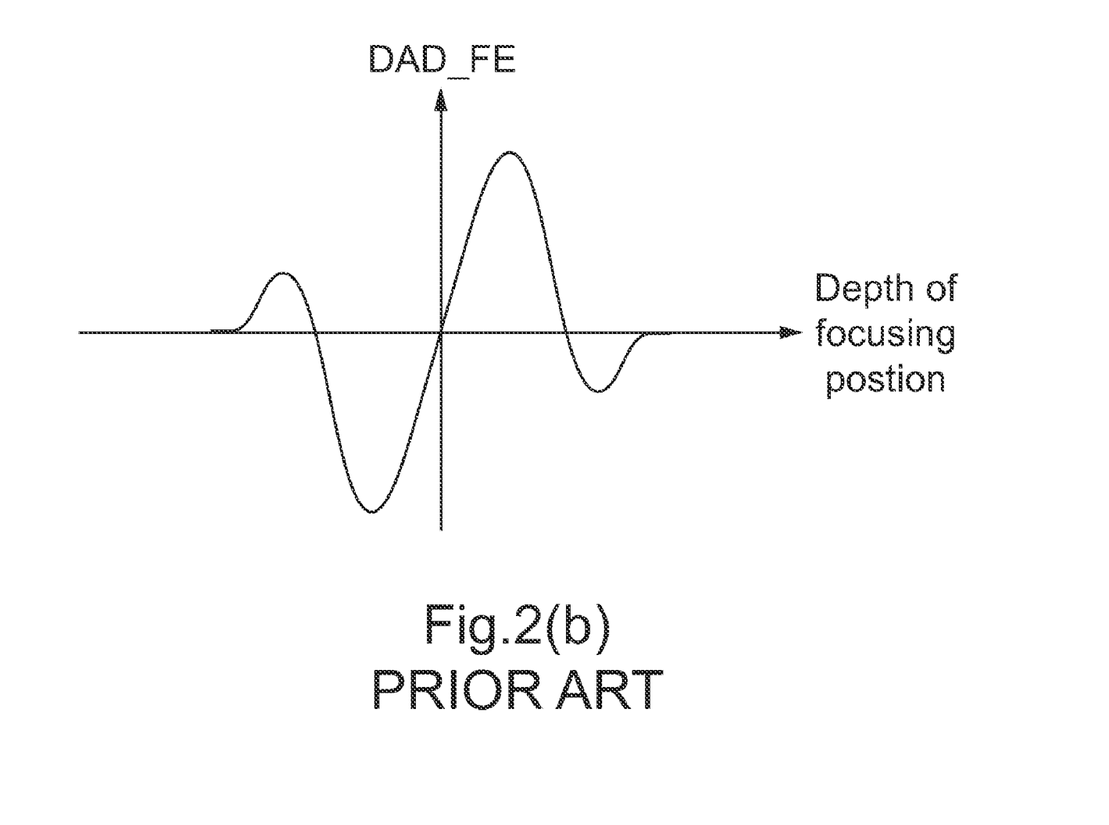
FIG. 2(b) is a waveform diagram schematically illustrating focusing error variations with focusing positions when focusing on a single-layer disc according to the differential astigmatic method.

Another focusing control method is so-called as a differential astigmatism method. For implementing the differential astigmatism method, the laser light emitted from a light source is diffracted through a diffraction grating to result in two sub-beams beside the main beam, as shown in FIG. 2(a). In this method, three optical sensors are used. The central optical sensor has four light receiving parts A, B, C and D for respectively receiving the main beam reflected from the disc. Whereas, the bilateral optical sensors have four light receiving parts E, F, G and H for respectively receiving the sub-beam reflected from the disc. According to the differential astigmatism method, the focusing error signal DAD_FE is calculated as DAD_FE=[(A+C)−(B+D)]−[(E+G)−(F+H)]× Kb, where A, B, C, D, E, F, G and H are light intensities received by the regions A, B, C, D, E, F, G and H, respectively, and Kb is a gain-adjusting coefficient. The relationship between the voltage of the differential astigmatism focusing error signal DAD_FE and the depth of the focusing position (or the distance of the focusing position from the lens) is illustrated in FIG. 2(b). Same as the astigmatic method, the differential astigmatism focusing control method is performed in a closed-loop control manner to zero the focusing error DAD_FE, thereby locating the perfect focusing position.

A typical DVD disc consists of two 0.6 mm thick substrates bonded together. Data can be recorded into either or both of the substrates. The basic type of DVD disc is the one with single data-recording side and single data-recording layer, which has a capacity of about 4.7 GB. A single-side dual-layer disc allowing data to be recorded at the same side but different depths enlarges the storage capacity up to 8.5 GB. A double-side single-layer disc doubles the capacity of the single-side single layer disc and is about 9.4 GB. In addition, a double-side dual-layer disc is also available, which has a capacity up to 17 GB.

It is understood from the above description that recording data in different layers or depths is able to largely enhance the storage capacity of an optical disc. In order to read data from different layers of the disc, the focusing position of the light beam is required to be changeable between layers. The shift of focusing positions of the light beam between the recording layers is achieved by a layer-jumping operation in the focusing direction. Therefore, layer-jumping control is required for this type of discs in addition to conventional focusing control.

Figure 3:
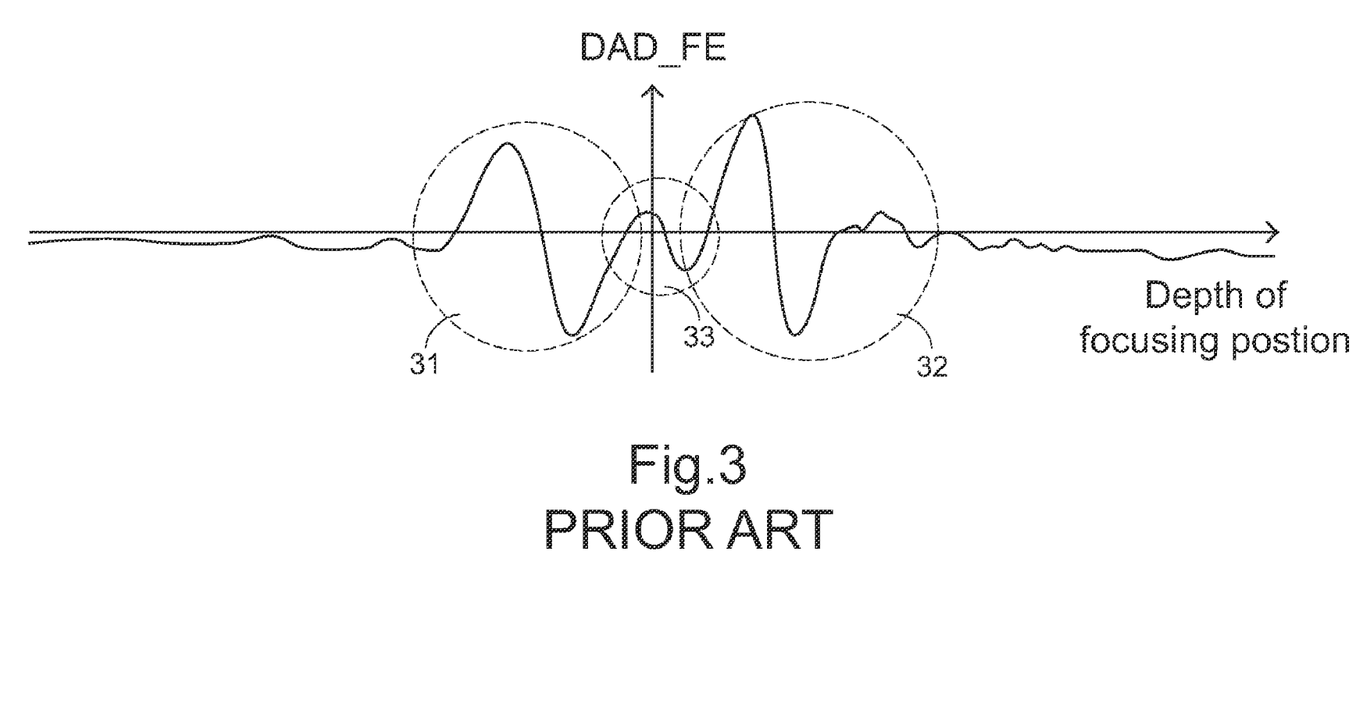
FIG. 3 is a waveform diagram schematically illustrating focusing error variations with focusing positions when focusing on a dual-layer disc according to the differential astigmatism method.
Figure 4:
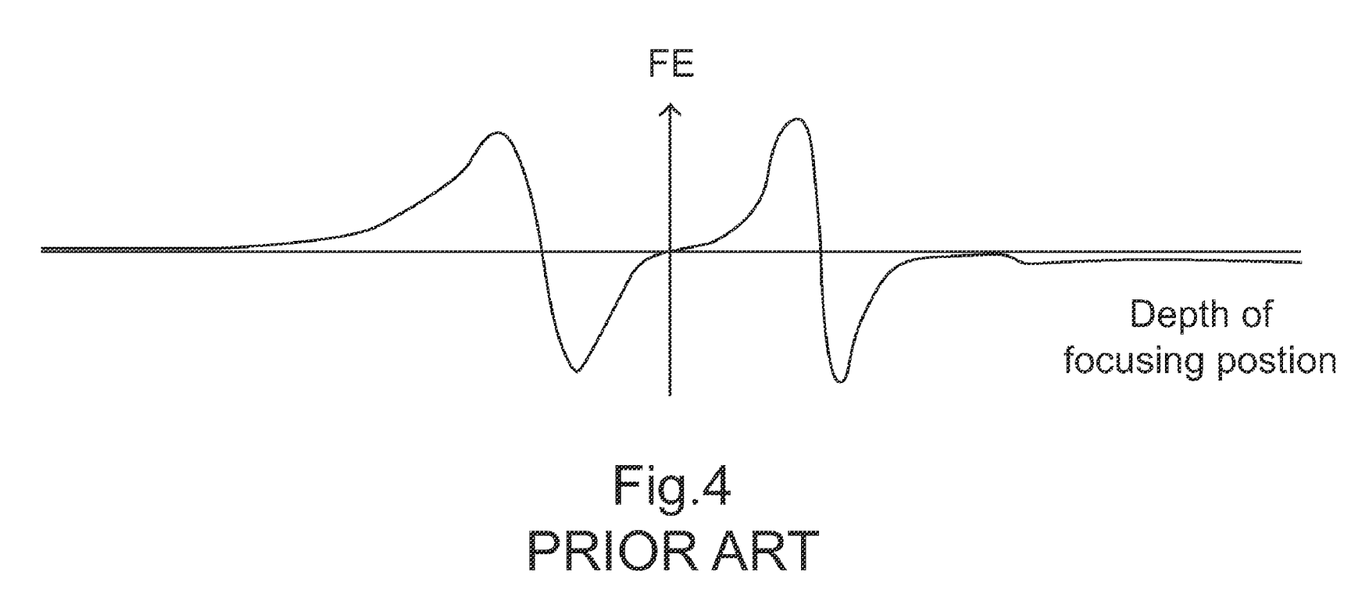
FIG. 4 is a waveform diagram schematically illustrating focusing error variations with focusing positions when focusing on a dual-layer disc according to the astigmatic method.

While the plots of FIG. 1(d) and FIG. 2(b) illustrate the focusing error variations with focusing positions when a single-layer disc is read, FIG. 3 and FIG. 4 illustrate the focusing error variations with focusing positions when a dual-layer disc is read. In FIG. 1(d) and FIG. 3, the astigmatism focusing control method is performed, and in FIG. 2(b) and FIG. 4, the differential astigmatism focusing control method is performed. Compared to the focusing error FE realized by the astigmatism method, the focusing error DAD_FE realized by the differential astigmatism method is generally more accurate and stable than the astigmatic method in the closed-loop control of focusing procedure. However, as far as the layer-jumping procedure of the differential astigmatism method in the open-loop control is concerned, there is fluctuation 33 mixed with two principal peak groups 31 and 32, as shown in FIG. 3, due to the effect of sub-beams. The layer jumping may fail because of focusing on the depth associated with the fluctuation 33 instead of the correct target depth associated with the principle peak group 31 or 32. Accordingly, errors would be introduced into subsequent closed-loop control at the appearance of fluctuation 33.

SUMMARY OF THE INVENTION

Therefore, the present invention provides a layer-jumping and focusing control method for use in a disc reading apparatus to stably and reliably locate the focusing position in the layer-jumping procedure.

The present invention relates to a layer-jump and focusing control method for use in a disc reading apparatus to correctly read data from a data storage medium having first and second recording layers, i.e. a dual-layer DVD disc. In the layer jump and focusing control method, a first focusing error signal is generated according to the differential astigmatism method in a closed-loop focusing control manner when focusing on the first recording layer. A second focusing error signal is generated according to the astigmatic method in an open-loop focusing control manner when a first layer-jumping procedure is performed to shift a focusing position from the first recording layer to the second recording layer. Then, the completion of the first layer-jumping procedure is determined according to the second focusing error signal, for example when the second focusing error signal passes the zero crossing point and exceeds a threshold level. Afterwards, a third focusing error signal is generated according to the differential astigmatism method in a closed-loop focusing control manner when focusing on the second recording layer.

Furthermore, the amplitude of the second focusing error signal need adjusting in the layer-jumping procedure, for example double the amplitude of the first focusing error signal in the normal focusing procedure.

In an embodiment, a fourth focusing error signal is generated according to the astigmatic method in an open-loop focusing control manner when a second layer-jumping procedure is performed to shift a focusing position from the second recording layer to the first recording layer. Likewise, the completion of the second layer-jumping procedure is determined according to the fourth focusing error signal.

The present invention also relates to a layer-jump and focusing control method for use in a disc reading apparatus to read an optical disc having first and second recording layers. The disc reading apparatus comprises an optical pickup head, a radio-frequency amplifier and an actuator. In the layer-jump and focusing control method, the optical pickup head generates first electric signals and second electric signals in response to light intensities reflected by the optical disc and received by a main region and a subordinate region of the optical pickup head, respectively. When the optical pickup head is focusing on the first or the second recording layer, the radio-frequency amplifier generates a first focusing error signal by operating the first electric signals and the second electric signals. According to the first focusing error signal, the actuator adjusts the focusing position of the optical pickup head. When the optical pickup head is being moved by the actuator to shift the focusing position from the first recording layer to the second recording layer or from the second recording layer to the first recording layer, the radio-frequency amplifier generates a second focusing error signal by operating the first electric signals. When the second focusing error signal complies with a predetermined condition, e.g. when the second focusing error signal passes the zero crossing point and exceeds a threshold level, the radio-frequency amplifier generates the first focusing error signal by operating the first electric signals and the second electric signals again.

Furthermore, for generating the second focusing error signal, the gain of the RF amplifier should be adjusted.

In an embodiment, the main region of the optical pickup head has four light receiving parts A, B, C and D for respectively receiving the main beam reflected from the optical disc, and the second focusing error signal is generated by operating the first electric signals according to the formula (A+C)−(B+D), where A, B, C and D are light intensities received by the light receiving parts A, B, C and D, respectively.

In an embodiment, the subordinate region of the optical pickup head has four light receiving parts E, F, G and H for respectively receiving the sub-beam reflected from the optical disc, and the first focusing error signal is generated by operating the first electric signals and the second electric signals according to the formula $[(A+C)−(B+D)]−[(E+G)−(F+H)]\times Kb$, where A, B, C, D, E, F, G and H are light intensities received by the regions A, B, C, D, E, F, G and H, respectively, and Kb is a gain-adjusting coefficient.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

From FIG. 3 and FIG. 4 which illustrate focusing error variations with focusing positions when the differential astigmatism method and the astigmatism method are applied, respectively, it is understood that the differential astigmatism method is advantageous in closed-loop focusing control and the astigmatism method is advantageous in open-loop control of layer jumping procedure. Therefore, the present invention makes use of the advantageous features of these two methods to enhance the accuracy of the layer-jumping and focusing control. Hereinafter, a process for improved layer-jumping and focusing control of a disc reading apparatus according to an embodiment of the present invention will be described with reference to the flowchart of FIG. 5 and the system of FIG. 6.

Figure 5:
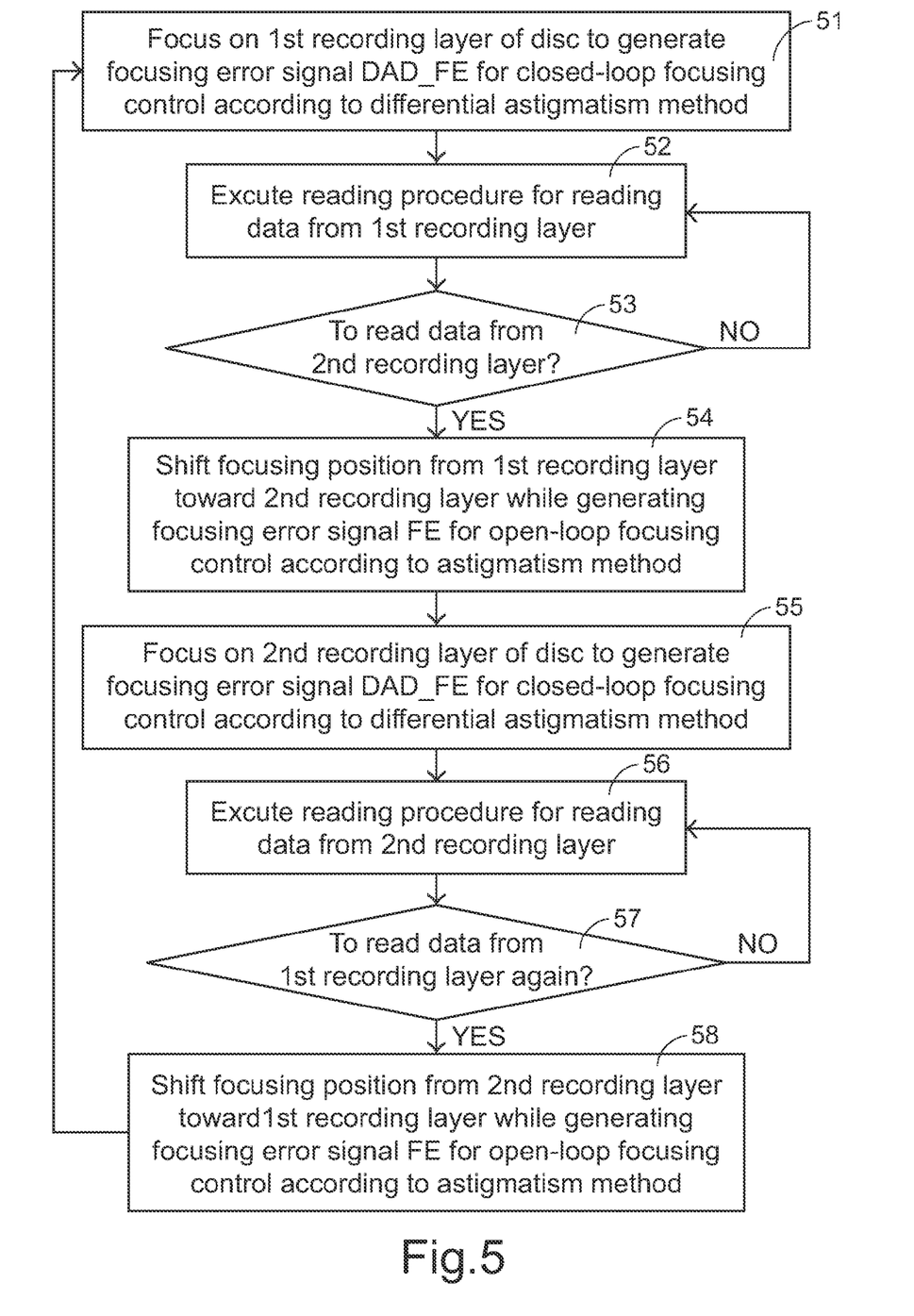
FIG. 5 is a flowchart illustrating a layer-jumping and focusing control method according to an embodiment of the present invention.
Figure 6:
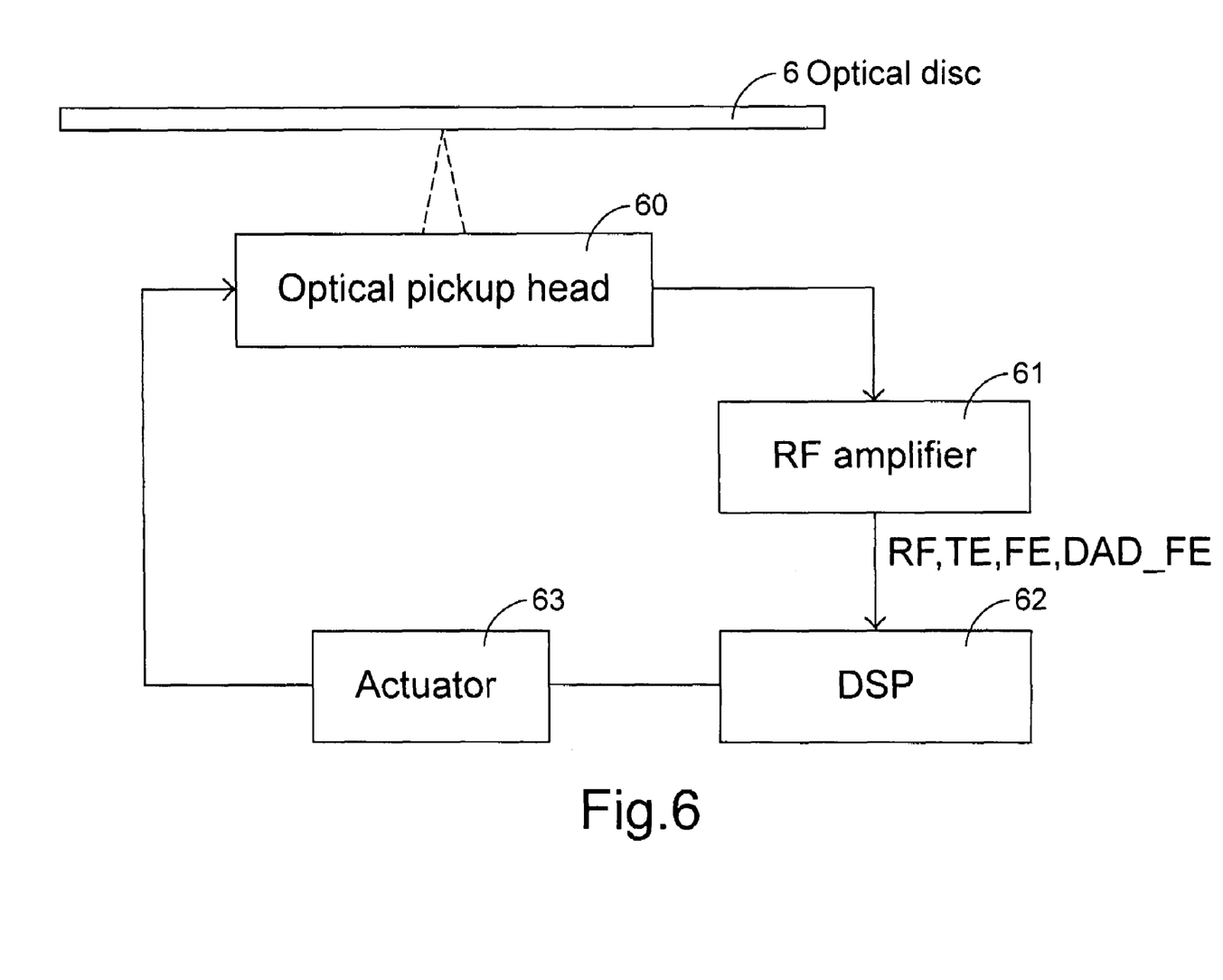
FIG. 6 is a functional block diagram illustrating a system applicable for executing the layer-jumping and focusing control method of FIG. 5.

In response to the light beams focused on and reflected by a certain recording layer, e.g. the first recording layer, of an optical disc 6, the optical pickup head 60 outputs associated electric signals to the radio frequency (RF) amplifier 61 in a closed-loop control manner. By the RF amplifier 61, a differential astigmatism focusing error signal DAD_FE is generated according to the differential astigmatism method (Step 51), wherein DAD_FE is equal to $[(A+C)−(B+D)]−[(E+G)−(F+H)]\times Kb$, where Kb is a gain-adjusting coefficient. The closed-loop focusing control approximates the focusing error signal DAD_FE to zero by processing the focusing error signal DAD_FE with the digital signal processor (DSP) 62 and adjusting the movement of the optical pickup head 60 in the focusing direction with the actuator 63. Then, a reading procedure can be executed under optimal focusing condition to read data from the first recording layer of the disc (Step 52).

When the data in the second recording layer is to be read (Step 53), a layer-jumping procedure is executed to shift the focusing position of the light beam from the first recording layer to the second recording layer by moving the optical pickup head 60 (Step 54). Meanwhile, the astigmatic method is implemented in the RF amplifier 61 to generate a focusing error signal FE in an open-loop control manner, wherein FE is equal to $[(A+C)-(B+D)] \times N$ where N is a gain-adjusting parameter. The introducing of the parameter N is due to the inherent amplitude difference between the differential astigmatism focusing error DAD_FE and the astigmatism focusing error FE. Accordingly, for improving the consistency of the focusing error FE with the focusing error DAD_FE in amplitude, the gain of the RF amplifier 61 need adjusting in the layer-jumping procedure, for example double the gain of the RF amplifier 61 in the layer-jumping procedure. Through the open-loop focusing control, the layer-jumping procedure is deemed complete when the focusing error signal has passed the zero crossing point and exceeds a threshold level.

Then, the differential astigmatism method is implemented on the second recording layer to generate a focusing error signal DAD_FE in a closed-loop control manner according the equation $DAD\_FE=[(A+C)-(B+D)]-[(E+G)-(F+H)] \times Kb$ (Step 55). Afterwards, a reading procedure is executed to read data from the second recording layer of the disc (Step 56).

Similarly, when it is necessary to execute another layer-jumping procedure to shift the focusing position from the second recording layer to the first recording layer, the astigmatism method is implemented again to determine the completion of the layer-jumping procedure based on the focusing error signal FE generated in an open-loop control manner (Steps 57 and 58). Then, Steps 51 and 52 are repeated to read data from the first recording layer again.

The present invention is applicable to read data from any suitable optical disc with at least two recording layer at the same side, such as single-side dual-layer DVD discs or double-side dual-layer DVD discs. Since the relatively reliable and stable differential astigmatism method is used to perform normal focusing control at a certain recording layer, and the zero-crossing-simplified astigmatic method is used to execute the layer-jumping procedure, the focusing position can be stably and reliably located in both the layer-jumping and focusing procedures.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A layer-jumping and focusing control method for reading a data storage medium having first and second recording layers, the method comprising steps of:
    generating a first focusing error signal according to the differential astigmatism method in a closed-loop focusing control manner when focusing on the first recording layer;
    generating a second focusing error signal according to the astigmatic method in an open-loop focusing control manner when a first layer-jumping procedure is performed to shift a focusing position from the first recording layer to the second recording layer;
    determining the completion of said first layer-jumping procedure according to said second focusing error signal; and
    generating a third focusing error signal according to the differential astigmatism method in a closed-loop focusing control manner when focusing on the second recording layer;
    generating a fourth focusing error signal according to the astigmatic method in an open-loop focusing control manner when a second layer-jumping procedure is performed to shift the focusing position from the second recording layer to the first recording layer; and
    determining completion of said second layer-jumping procedure according to said fourth focusing error signal.

2. The method according to claim 1 wherein the completion of said first layer-jumping procedure is determined when said second focusing error signal passes the zero crossing point and exceeds a threshold level.

3. The method according to claim 1 further comprising a step of adjusting an amplitude of said second focusing error signal.

4. The method according to claim 1 wherein the data storage medium is a dual-layer DVD disc.

5. A layer-jumping and focusing control method for use in a disc reading apparatus to read an optical disc having first and second recording layers, the disc reading apparatus comprising an optical pickup head, a radio-frequency amplifier and an actuator, and the method comprising steps of:
    the optical pickup head generating first electric signals and second electric signals in response to light intensities reflected by the optical disc and received by a main region and a subordinate region of the optical pickup head, respectively;
    the radio-frequency amplifier generating a first focusing error signal by operating said first electric signals and said second electric signals when the optical pickup head is focusing on the first or the second recording layer;
    the actuator adjusting the focusing position of the optical pickup head according to said first focusing error signal;
    the radio-frequency amplifier generating a second focusing error signal by operating said first electric signals only when the optical pickup head is being moved by the actuator to shift the focusing position from the first recording layer to the second recording layer or from the second recording layer to the first recording layer; and
    the radio-frequency amplifier generating said first focusing error signal by operating said first electric signals and said second electric signals again when said second focusing error signal complies with a predetermined condition.

6. The method according to claim 5 further comprising a step of adjusting a gain of the RF amplifier for generating said second focusing error signal.

7. The method according to claim 5 wherein said predetermined condition is satisfied when said second focusing error signal passes the zero crossing point and exceeds a threshold level.

8. The method according to claim 5 wherein said main region of the optical pickup head includes four light receiving parts A, B, C and D for respectively receiving the main beam reflected from the optical disc, and said second focusing error signal is generated by operating said first electric signals according to the formula (A+C)−(B+D), where A, B, C and D are light intensities received by the light receiving parts A, B, C and D, respectively.

9. The method according to claim 8 wherein said subordinate region of the optical pickup head includes four light receiving parts B, F, U and H for respectively receiving the sub-beam reflected from the optical disc, and said first focusing error signal is generated by operating said first electric signals and said second electric signals according to the formula [(A+C)−(B+D)]−[(E+G)−(F+H)]×Kb, where A, B, C, D, E, F, G and H are light intensities received by the regions A, B, C, D, E, F, C and H, respectively, and Kb is a gain-adjusting coefficient.

10. The method according to claim 5 wherein the optical disc is a dual-layer DVD disc.

* * * * *